(12) United States Patent
Hosoya et al.

(10) Patent No.: US 8,652,560 B2
(45) Date of Patent: Feb. 18, 2014

(54) PACKAGED BEVERAGES

(75) Inventors: Naoki Hosoya, Tokyo (JP); Shinji Yamamoto, Tokyo (JP); Masaki Iwasaki, Tokyo (JP); Eiichi Hoshino, Tokyo (JP); Yoshikazu Ogura, Tokyo (JP)

(73) Assignee: Kao Corporation, Tokyo (JP)

( * ) Notice: Subject to any disclaimer, the term of this patent is extended or adjusted under 35 U.S.C. 154(b) by 885 days.

(21) Appl. No.: 11/845,356

(22) Filed: Aug. 27, 2007

(65) Prior Publication Data

US 2008/0038408 A1    Feb. 14, 2008

Related U.S. Application Data

(63) Continuation-in-part of application No. 11/010,511, filed on Dec. 14, 2004, now abandoned.

(30) Foreign Application Priority Data

Dec. 16, 2003    (JP) .................................. 2003-417505

(51) Int. Cl.
*A23L 2/00* (2006.01)
*A23L 1/302* (2006.01)
*A23F 3/00* (2006.01)

(52) U.S. Cl.
USPC ............... 426/590; 426/66; 426/72; 426/106; 426/597

(58) Field of Classification Search
USPC .............................. 426/66, 590, 597, 72, 106
See application file for complete search history.

(56) References Cited

U.S. PATENT DOCUMENTS

| 4,946,701 | A | * | 8/1990 | Tsai et al. ........................ 426/597 |
| 5,681,569 | A | * | 10/1997 | Kuznicki et al. ............... 424/439 |
| 6,413,558 | B1 | * | 7/2002 | Weber et al. ........................ 426/2 |
| 2003/0077374 | A1 | * | 4/2003 | Ohishi et al. ................... 426/597 |
| 2003/0091690 | A1 | | 5/2003 | Somoto et al. |
| 2003/0096050 | A1 | * | 5/2003 | Inaoka et al. ................... 426/597 |
| 2004/0028793 | A1 | * | 2/2004 | Inaoka et al. ................... 426/590 |
| 2004/0065207 | A1 | * | 4/2004 | Oishi et al. ........................ 99/275 |
| 2007/0128327 | A1 | * | 6/2007 | Takashima et al. ............ 426/597 |

FOREIGN PATENT DOCUMENTS

| EP | 0 423 419 A1 | 4/1991 |
| EP | 1 293 130 A1 | 3/2003 |
| JP | 60-156614 | 8/1985 |
| JP | 3-133928 | 6/1991 |
| JP | 3-246226 | 11/1991 |
| JP | 5-168407 | 7/1993 |
| JP | 6-142405 | 5/1994 |
| JP | 7-238078 | 9/1995 |
| JP | 8-109178 | 4/1996 |
| JP | 8-298930 | 11/1996 |
| JP | 10-67771 | 3/1998 |
| JP | 11-504224 | 4/1999 |
| JP | 2000-354475 | 12/2000 |
| JP | 2002-142677 | 5/2002 |
| TW | 323945 | 1/1998 |
| TW | 503084 | 9/2002 |
| WO | WO 97/30597 | 8/1997 |
| WO | WO2005053415 | * 6/2005 |

OTHER PUBLICATIONS

WO2005053415 Derwent Abstract.*
U.S. Appl. No. 12/183,675, filed Jul. 31, 2008, Iwasaki, et al.
U.S. Appl. No. 12/183,707, filed Jul. 31, 2008, Iwasaki, et al.

* cited by examiner

*Primary Examiner* — Humera Sheikh
*Assistant Examiner* — Saeeda Latham
(74) *Attorney, Agent, or Firm* — Oblon, Spivak, McClelland, Maier & Neustadt, L.L.P.

(57) ABSTRACT

A non-tea-based, packaged beverage with a green tea extract mixed therein contains the following ingredients (A) and (B): (A) 0.06 to 0.5 wt. % of non-polymer catechins, and (B) 9 to 13.5 mM of citric acid or a salt thereof. Its pH is from 3.4 to 4.2. The non-tea-based, packaged beverage contains catechins at a high concentration, is reduced in bitterness and astringency, is suited for long-term drinking, and is excellent in the stability of bitterness and astringency and also in the feeling as it passes down the throat, and moreover, its color tone remains stable over a long term even when packed in a clear package and stored at high temperatures.

18 Claims, No Drawings

PACKAGED BEVERAGES

REFERENCE TO RELATED APPLICATIONS

This application is a continuation-in-part of a copending U.S. patent application Ser. No. 11/010,511 filed on Dec. 14, 2004, which is incorporated herein by reference and which claims priority under 35 USC 119 (a) to Japanese patent application No. 2003-417505 filed Dec. 16, 2003, the teachings of which are incorporated herein by reference and priority to which is claimed herein.

BACKGROUND OF THE INVENTION

1. Field of the Invention

This invention relates to non-tea-based packaged beverages.

2. Background of the Invention

As effects of catechins, there have been reported a suppressing effect on an increase in cholesterol level and an inhibitory effect on α-amylase activity (see, for example, JP-A-60-156614 and JP-A-03-133928). For such physiological effects to occur, an adult is required to drink 4 to 5 cups of tea per day. Therefore, it is increasingly desired to develop a technology for adding catechins at a high concentration to beverages so that a large amount of catechins can be ingested more conveniently. As an instance of such methods, catechins are added in a dissolved form to a beverage by using a concentrate of a green tea extract (see, for example, JP-A-2002-142677, JP-A-8-298930 and JP-A-8-109178) or the like.

Meanwhile, there are other methods designed to make use of citric acid for beverages, such as the use of citric acid along with the addition of citric acid to aloe juice, as an organic acid for causing binding of nitrate ions, which are harmful to the health, on an anion exchange resin as a treatment in the technology of lowering the concentration of nitrate ions in plant juice and the use of citric acid as a pH regulator for green tea beverages and the like, and citric-acid-containing beverages with a green tea extract mixed therein (see, for example, JP-A-3-246226, JP-A-2000-354475, JP-A-5-168407, and JP-A-11-504224).

SUMMARY OF THE INVENTION

A first aspect of the present invention provides a non-tea-based packaged beverage with a green tea extract mixed therein, which contains the following ingredients (A) and (B): 0.06 to 0.5 wt. % of non-polymer catechins (A), and 9 to 13.5 mM of citric acid or a salt thereof (B), wherein: the pH of the packaged beverage ranges from 3.4 to 4.2.

Moreover, a second aspect of the present invention provides a packaged beverage with which a purified product of a green tea extract is mixed, the beverage comprising 0.06 to 0.5 wt. % of non-polymer catechins (A), the percentage of non-epimers (B) of the non-polymer catechins in the non-polymer catechins (A) being from 5 to 25 wt. %, the beverage comprising 0.01 to 0.5 wt. % of one or more acidifiers (C) selected from the group consisting of citric acid, gluconic acid, tartaric acid, lactic acid, fumaric acid, malic acid, phosphoric acid, and ascorbic acid, the beverage comprising 0.01 to 0.5 wt. % of a pH adjuster (D) selected from the group consisting of sodium salts and potassium salts of citric acid, gluconic acid, tartaric acid, lactic acid, fumaric acid, malic acid, phosphoric acid, ascorbic acid and other acids, the ratio by weight of the component (D)/the component(s) (C) [(D)/(C)] being from 0.5 to 5.0, and the beverage comprising 0.0001 to 20 wt. % of a sweetener (E).

DETAILED DESCRIPTION OF THE INVENTION

If a concentrate of the conventionally available green tea extract is used without any modification, this could cause strong astringency and bitterness under the influence of the components contained in the concentrate of green tea extract and give an uncomfortable feeling when swallowed, so it is said to be unsuitable for the long-term drinking required to generate the physiological effects of catechins.

Further, none of the above-described techniques have succeeded in providing a beverage which, despite the mixing of catechins at a high concentration, can reduce the inherent astringency derived from the catechins and assure an adequate sour taste.

The present invention relates to a non-tea-based packaged beverage which contains catechins at a high concentration by mixing therein a green tea extract, achieving benefits including a reduction in astringency and the assurance of an adequate sour taste, appropriate sourness, and suitability for long-term drinking.

The present inventors therefore have conducted an investigation toward the improvement of the flavor and taste durable for long-term drinking of a non-tea-based packaged beverage containing catechins at a high concentration. As a result, it has been found that a non-tea-based packaged beverage containing catechins at a high concentration can be obtained in a form suited for long-term drinking by controlling the concentration of citric acid or a salt thereof and the pH of the non-tea-based packaged beverage.

The packaged beverage according to the present invention contains non-polymer catechins at a high concentration, does not have the flavor and taste of green tea, is not distastefulness or does not have an unappealing smell, and this beverage is reduced in bitterness and astringency, has adequate sourness, and is suited for long-term drinking. When filled in a clear package, its external appearance is good.

The inventors have further investigated about an improvement in the taste of packaged beverages containing catechins at a high concentration. As a result, the inventors found out that there is obtained a packaged beverage about which an appropriate sourness is obtained and bitterness is decreased by using a sour seasoning and a pH adjuster together and further the amount of the contained catechins can be kept in spite of storage of the beverage for a long term by controlling the percentage of non-epimers of the non-polymer catechins.

The term "non-polymer catechins" (A) as used herein is a generic term which collectively encompasses non-epicatechins such as catechin, gallocatechin, catechingallate and gallocatechingallate, and epicatechins such as epicatechin, epigallocatechin, epicatechingallate and epigallocatechingallate, thus indicating catechins in the form of non-polymers.

The packaged beverage according to the present invention contains the non-polymer catechins (A), each of which is a non-polymer and is preferably in a dissolved form in water, at a content of from 0.06 to 0.5 wt. %, preferably from 0.07 to 0.5 wt. %, more preferably from 0.08 to 0.5 wt. %, even more preferably from 0.092 to 0.5 wt. %, even more preferably from 0.092 to 0.4 wt. % and even more preferably from 0.1 to 0.3 wt. %. Insofar as the content of non-polymer catechins falls within the above-described range, a great amount of non-polymer catechins can be taken with ease, and from the standpoint of the color tone of the beverage shortly after its preparation, this content range is also preferred. The concentration of the non-polymer catechins can be adjusted by the amount of green tea extract to be mixed in.

In general, the amount of daily intake of green tea required for an adult to exhibit the effects of the promotion of burning of accumulated fat, the promotion of burning of dietary fat and the promotion of β-oxidation gene expression in the liver is considered to be preferably 300 mg or more, more preferably 450 mg or more, even more preferably 500 mg or more in terms of non-polymer catechins. Specifically, it has been confirmed that an anti-puffiness effect and/or visceral fat reducing effect can be brought about by consuming a packaged beverage which contains 483 mg, 555 mg, 900 mg or so of non-polymer catechins per package everyday at a rate of one package per day (JP-A-2002-326932).

Therefore, the amount of daily intake of the packaged beverage according to the present invention can also be preferably 300 mg or more, more preferably 450 mg or more, and even more preferably 500 mg or more in terms of non-polymer catechins. From the standpoint of the requirement for minimum daily intake, it is suggested that non-polymer catechins be mixed in an amount of preferably 300 mg or more, more preferably 450 mg or more, and even more preferably 500 mg or more per piece of the packaged beverage according to the present invention.

In the packaged beverage according to the present invention, citric acid or its salt (B) is contained at a concentration of from 9 to 13.5 mM. A concentration of citric acid or its salt lower than 9 mM may lead to excessively weak sourness, notwithstanding reduced bitterness and astringency. A concentration of citric acid or its salt higher than 13.5 mM, on the other hand, may result in strong bitterness and astringency, notwithstanding the stronger sourness. Examples of citric acid or its salt include trisodium citrate and citric acid.

In the packaged beverage according to the present invention, it is also essential from the standpoint of taste that the pH of the beverage falls within the range of from 3.4 to 4.2, besides the concentration of citric acid or its salt. Specifically, a pH lower than 3.4 tends to result in stronger astringency, while the overall taste becomes fuzzy at a pH higher than 4.2. By controlling both the concentration of citric acid or its salt and the pH of the beverage within the above-described ranges, it is possible to provide a beverage with reduced bitterness and astringency accompanied by an adequate sourness.

The weight ratio of the non-polymer catechins to caffeine in the packaged beverage according to the present invention may be preferably from 5 to 10,000, more preferably from 6 to 8,000, even more preferably from 7 to 6,000, even more preferably from 10 to 4,000, and even more preferably from 10 to 1,000. An excessively low ratio of the non-polymer catechins to caffeine is not preferred because the inherent external appearance of the beverage is impaired. On the other hand, an unduly high ratio of the non-polymer catechins to caffeine is not preferred from the standpoint of the balance of flavor or taste. The term "caffeine" (C) used here means not only caffeine which naturally exists in the green tea extract employed as a raw material and also in flavorants, fruit juices and other ingredients employable as optional raw materials, but also any caffeine which may be added newly.

The non-epimers hardly exist in the nature, and they are produced by thermal denaturation of epimers. Furthermore, when the non-polymer catechins undergo thermal denaturation, the catechins are changed to polymer catechins. Accordingly, the percentage of the non-epimers (B) of the non-polymer catechins in the non-polymer catechins (A) that can be used in the packaged beverage of the invention (the percentage of the non-epimers: [(B)/(A)]×100) is from 5 to 25 wt. %, preferably from 8 to 20 wt. %, and more preferably from 10 to 15 wt. from the viewpoint of the taste and the storage stability of the beverage.

The non-polymer catechins in the packaged beverage of the invention are classified into the group of gallates, elements of which are epigallocatechin gallate, gallocatechin gallate, epicatechin gallate, and catechin gallate, and the group of non-gallates, elements of which are epigallocatechin, gallocatechin, epicatechin, and catechin.

The gallates are strong in bitterness. Thus, it is preferred from the viewpoint of the suppression of bitterness that the percentage of the non-polymer catechin gallates (F) in the non-polymer catechins (A) that can be used in the packaged beverage of the invention (the percentage of the gallates: [(F)/(A)×100]) is preferably from 5 to 50 wt. %, more preferably from 8 to 46 wt. %.

About the packaged beverage of the invention which contains the non-polymer catechins at a high-concentration, the concentration of the non-polymer catechins can be adjusted by incorporating a concentrate of a green tea extract into the beverage while using a purified product of a tea extract together. Specific examples of the concentrate include an aqueous solution of a concentrate of a green tea extract, and a product wherein a green tea extracted liquid is blended with a concentrate of a green tea extract. The concentrate of the green tea extract referred to herein is a product obtained by extracting components from green tea leaves by use of hot water or a water-soluble organic solvent and then partially removing the water from the resultant extracted-component-contained solution. The purified product of a green tea extract is a product obtained by making the concentration of the non-polymer catechins high by purifying the green tea extract. Examples of the form thereof include a solid, an aqueous solution, and a slurry. The green tea extracted liquid is a liquid extract without undergoing any concentrating or purifying operation.

The purified product of a green tea extract containing the non-polymer catechins can be selected from commercially available products, such as "POLYPHENONE" manufactured by Mitsui Norin Co., Ltd., "TEAFURAN" manufactured by ITO EN LTD., and "SUNPHENON" manufactured by Taiyo Kagaku Co., Ltd. When any one of these commercially available products has a concentration of the non-polymer catechins in the above-mentioned range, a material obtained by purifying the product can be used. An example of the method for the purification is a method of suspending a concentrate of a green tea extract into water, or a mixture of water and an organic solvent such as ethanol, removing the resultant precipitation, and next distilling off the solvent. Alternatively, the following may be used: a product obtained by concentrating an extract extracted from tea leaves by use of hot water or a water-soluble organic solvent such as ethanol and then purifying the resultant; or a product obtained by purifying the extract directly. The concentration of the non-polymer catechins in the purified product of the green tea extract is preferably from 0.9 to 30 wt. %, more preferably from 1.0 to 20 wt. %.

About the non-polymer catechins used in the invention, the percentage of gallates therein can be decreased by subjecting the green tea extract or the concentrate thereof to tannase treatment. In the tannase treatment, tannase is preferably added to the non-polymer catechins of the green tea extract at a concentration from 0.5 to 10 wt. %. The temperature for the tannase treatment is preferably from 15 to 40° C., at which the activity of the enzyme can be obtained. The temperature is more preferably from 20 to 30° C. The pH in the tannase treatment is from 4 to 6, at which the activity of the enzyme can be obtained. The pH is more preferably from 4.5 to 6, even more preferably from 5 to 6. The resultant tannase-treated product can be used after being purified.

The ratio by weight of caffeine (G) to the non-polymer catechins (A) [(G)/(A)] in the packaged beverage of the invention is preferably from 0.0001 to 0.16, more preferably from 0.001 to 0.1, even more preferably from 0.01 to 0.08, and even more preferably from 0.04 to 0.07. If the ratio by weight of the caffeine to the non-polymer catechins is less than 0.0001, a bad effect is produced on the balance between tastes. If the ratio by weight of the caffeine to the non-polymer catechins is more than 0.16, the original external appearance of the beverage is unfavorably damaged. The caffeine may be caffeine existing naturally in the green tea extract, a flavor, a fruit juice and other components that are used as materials of the beverage, or may be newly-added caffeine.

The sour seasoning (C) in the packaged beverage of the invention is selected from citric acid, gluconic acid, tartaric acid, lactic acid, fumaric acid, malic acid, phosphoric acid, and ascorbic acid. Citric acid or phosphoric acid is preferred to give an optimal sourness to the beverage. One or more selected from these acidifiers are contained in the packaged beverage of the invention at a concentration of preferably from 0.01 to 0.5 wt. %, more preferably from 0.02 to 0.3 wt. %.

The pH adjuster (D) in the packaged beverage of the invention is selected from sodium salts and potassium salts of citric acid, gluconic acid, tartaric acid, lactic acid, fumaric acid, malic acid, phosphoric acid, and ascorbic acid. Specific examples thereof include trisodium citrate, monopotassium citrate, tripotassium citrate, sodium gluconate, potassium gluconate, sodium tartrate, trisodium tartrate, potassium hydrogen tartrate, sodium lactate, potassium lactate, sodium fumarate, tripotassium hydrogen phosphate, ammonium bihydrogen phosphate, bipotassium hydrogen phosphate, disodium hydrogen phosphate, sodium bihydrogen phosphate, trisodium metaphosphate, and tripotassium phosphate. Trisodium citrate or tripotassium phosphate is preferred to give an optima sourness to the beverage. One or more selected from such pH adjusters is contained in the packaged beverage of the invention at a concentration of preferably from 0.01 to 0.5 wt. %, more preferably from 0.1 to 0.4 wt. %.

In the packaged beverage of the invention, the sour seasoning and the pH adjuster are used together, thereby adjusting the pH to 5.1 or less so as to cause the beverage to have an optimal sourness by buffer effect. The ratio by weight of the contained sour seasoning (C) to the contained pH adjuster (D) [(D)/(C)] is from 0.5 to 5.0. The ratio by weight is preferably from 0.55 to 3.0, more preferably from 0.58 to 2.8, and even more preferably from 0.6 to 2.6. If this ratio [(D)/(C)] is less than 0.5, the bitterness and astringency of the beverage can be suppressed but the sourness is too weak so that the storability over a long term deteriorates. On the other hand, if the ratio is more than 5, the sourness becomes strong but the bitterness and astringency also become strong so that the storability over a long term deteriorates. The pH of the packaged beverage of the invention is preferably from 2.5 to 5.1, more preferably from 3.0 to 5.0, and even more preferably from 3.5 to 4.5.

In the packaged beverage of the invention, the following can be used as the sweetener (E): carbohydrates, glycerols and sugar alcohols, which are naturally produced, and artificial sweeteners. One or more selected from such sweeteners are contained in the beverage of the invention at a concentration of preferably from 0.0001 to 20 wt. %, more preferably from 0.001 to 15 wt. %, and even more preferably from 0.002 to 10 wt. %. One or more sweeteners in the tea extract are also included in the category of the sweetener (E).

Although the packaged beverage of the present invention containing the above-described components has a green tea extract mixed therein, it is reduced in the flavor and taste derived from green tea as well as in the original taste of green tea. For this reason it is preferably provided as a non-tea-based packaged beverage, preferably as a sports drink. The term "non-tea-based beverage" here is defined as a soft drink which scarcely has flavor and taste derived from such teas as green tea, oolong tea and black tea and the like, and examples of soft drinks include sports drinks, isotonic drinks, fruit-juice containing drinks, vegetable-juice containing drinks and the like. The term "sports drink" is generally defined as a drink that can promptly replenish water and minerals lost in the form of sweat during physical exercise.

The packaged beverage according to the present invention may contain sodium ions and/or potassium ions. Packaged beverages of the present invention with such ions incorporated therein are useful in the form of drinks such as sports drinks and isotonic drinks.

Sodium and potassium can be mentioned as primary physiological electrolytes. As their ion sources, their corresponding citrates can be used. As an alternative, their corresponding other water-soluble components or inorganic salts can also be used. Such ion components are also found in fruit juices and tea extracts. The amount of an electrolyte or ion component in the packaged beverage is its content in the final packaged beverage ready for drinking. The concentration of each electrolyte is expressed in terms of "ion concentration".

In the packaged beverage according to the present invention, a potassium ion component may be mixed in the form of potassium citrate. As an alternative, it may be mixed in the form of potassium chloride, potassium carbonate, potassium sulfate, potassium acetate, potassium hydrogencarbonate, potassium phosphate, potassium hydrogenphosphate, potassium tartrate, potassium sorbate or a mixture thereof or as a component of added fruit juice or tea. In the packaged beverage according to the present invention, potassium ions can be contained at a concentration of preferably from 0.001 to 0.2 wt. %, more preferably from 0.002 to 0.15 wt. %, and even more preferably from 0.003 to 0.12 wt. %.

A sodium ion component may also be mixed in the form of sodium citrate. As an alternative, it may be mixed in the form of sodium chloride, sodium carbonate, sodium hydrogencarbonate, sodium phosphate, sodium hydrogenphosphate, sodium tartrate, sodium benzoate or a mixture thereof or as a component of added fruit juice or tea. A lower sodium ion concentration is desired from the standpoint of facilitating the absorption of water under osmotic pressure. Preferably, however, the sodium ion concentration should be controlled to such a low extent that it can prevent water from being absorbed into the intestine from the body under osmotic pressure. This sodium ion concentration can preferably be lower than the plasma sodium ion concentration. In the packaged beverage according to the present invention, sodium ions can be contained at a concentration of preferably from 0.001 to 0.5 wt. %, more preferably from 0.002 to 0.4 wt. %, and even more preferably from 0.003 to 0.2 wt. %.

The total concentration of potassium ions and sodium ions in the packaged beverage according to the present invention can be preferably from 0.001 to 0.7 wt. %, more preferably from 0.002 to 0.6 wt. %, and even more preferably from 0.002 to 0.35 wt. Depending upon the situation of ingestion, an excessively low total concentration of sodium ions and potassium ions may be unable to provide a fulfilled feeling in taste and to achieve an effective replenishment of minerals, and therefore may not be preferred. An unduly high total concentration of sodium ions and potassium ions, on the other hand, leads to stronger tastes of the salts themselves and is not preferred for long-term drinking.

In the packaged beverage according to the present invention, chloride ions may also be incorporated in addition to potassium ions and sodium ions. The content of chloride ions can be preferably from 0.001 to 0.5 wt. %, more preferably from 0.002 to 0.4 wt. %, and even more preferably from 0.003 to 0.3 wt. %. Chloride ions may be mixed in the form of a salt such as sodium chloride or potassium chloride. Further, trace ions such as calcium, magnesium, zinc and/or iron ions may also be mixed. These ions may also be mixed in the form of salt or salts. The total amount of ions existing in the beverage preferably includes an added amount of ions and an amount of ions naturally existing in the beverage. When sodium chloride is added, for example, the amounts of sodium ions and chloride ions in the thus-added sodium chloride are included in the total amount of ions existing in the beverage.

As sweeteners usable in the packaged beverage according to the present invention, artificial sweeteners are preferred. More preferred are single systems of artificial sweeteners, combinations of artificial sweeteners and glucose compounds, and combinations of artificial sweeteners and fructose compounds. Artificial sweeteners usable in the present invention include, for example, high-sweetness sweeteners such as saccharin, saccharin sodium, aspartame, acesulfame-K, sucralose and neotame; and sugar alcohols such as sorbitol, erythritol and xylitol. As commercial products, "SLIM-UP SUGAR", composed of aspartame, "LAKANTO-S", which contains erythritol, and "PALSWEET", composed of erythritol and aspartame, may be used as desired.

When the packaged beverage according to the present invention is intended to replenish energy at the same time, the sweetener in the packaged beverage can preferably be a carbohydrate sweetener. Examples of the carbohydrate sweetener include soluble carbohydrates. A soluble carbohydrate generally plays a dual role as a sweetener and an energy source. Upon choosing a soluble carbohydrate for use in the preferred packaged beverage according to the present invention, it is important to take the need for a sufficient gastric emptying rate and intestinal absorption rate into consideration. The soluble carbohydrate can be a mixture of glucose and fructose, a carbohydrate hydrolyzable into glucose and fructose in the digestive tract, or a carbohydrate capable of forming glucose and fructose. The term "carbohydrate" as used herein includes monosaccharides, oligosaccharides, conjugated polysaccharides, and mixtures thereof.

Monosaccharides usable in the packaged beverage according to the present invention include, for example, tetroses, pentoses, hexoses and ketohexoses. As hexoses, aldohexoses such as glucose known as grape sugar are preferred. The content of glucose in the packaged beverage according to the present invention can be preferably from 0.0001 to 20 wt. %, more preferably from 0.001 to 15 wt. %, and even more preferably from 0.001 to 10 wt. %. As an illustrative ketohexose, fructose known as fruit sugar is preferred. The content of fructose in the packaged beverage according to the present invention is preferably from 0.0001 to 20 wt. %, more preferably from 0.001 to 15 wt. %, and even more preferably from 0.001 to 10 wt. %.

An oligosaccharide usable in the packaged beverage according to the present invention may be a carbohydrate formed in vivo from two monosaccharides selected from the above-described monosaccharides. Examples include sucrose, maltodextrin, corn syrup, and fructose-rich corn syrup. Disaccharides are preferred as oligosaccharides. As an illustrative disaccharide, sucrose known as cane sugar or beet sugar can be mentioned. The content of sucrose in the packaged beverage according to the present invention is preferably from 0.001 to 20 wt. %, more preferably from 0.001 to 15 wt. %, and even more preferably from 0.001 to 10 wt. %.

The packaged beverage according to the present invention is obtained by mixing in a green tea extract.

The weight ratio of the non-polymer catechins to caffeine in the green tea extract for use in the present invention may be preferably from 5 to 10,000, more preferably from 6 to 8,000, even more preferably from 7 to 6,000, even more preferably from 10 to 4,000, and even more preferably from 10 to 1,000. An unduly small ratio of non-polymer catechins to caffeine in green tea extract may result in the inclusion of a great deal of ingredients other than non-polymer catechins in a beverage, impair the inherent external appearance of the beverage, and therefore, is not preferred. An excessively high ratio of non-polymer catechins to caffeine in green tea extract, on the other hand, may result in the removal of tea-leaves-derived astringency suppressor components at the same time as the elimination of caffeine and, therefore, is not preferred from the standpoint of the balance of flavor and taste.

The concentration of non-polymer catechins in the green tea extract for use in the present invention can be preferably from 20 to 90 wt. %, more preferably from 20 to 87 wt. %, even more preferably from 23 to 85 wt. %, and even more preferably from 25 to 82 wt. %. An unduly low concentration of non-polymer catechins in green tea extract may lead to an increase in the amount of a purified product itself of the green tea extract, which is to be mixed in a beverage. An excessively high concentration of non-polymer catechins in a green tea extract, on the other hand, may tend to eliminate trace components and the like other than total polyphenols which are attributable to improved flavor and taste, such as free amino acids, existing in the green tea extract.

The percentage of the generic term "catechin gallates", which includes catechin gallate, epicatechin gallate, gallocatechin gallate and epigallocatechin gallate, based on all non-polymer catechins in the green tea extract for use in the present invention can preferably be from 35 to 100 wt. % from the standpoint of the effectiveness of the physiological action of the non-polymer catechins. From the standpoint of the ease in adjusting the taste, the percentage of catechin gallates may be preferably from 35 to 98 wt. %, more preferably from 35 to 95 wt. %.

From the standpoint of ease of drinking, a bitterness suppressor may be preferably mixed in the packed beverage according to the present invention. Although no particular limitation is imposed on the bitterness suppressor, a cyclodextrin is preferred. As the cyclodextrin, an $\alpha$-, $\beta$- or $\gamma$-cyclodextrin or a branched $\alpha$-, $\beta$- or $\gamma$-cyclodextrin may be used. In the packaged beverage according to the present invention, a cyclodextrin may be contained at a concentration of preferably from 0.005 to 0.5 wt. %, more preferably from 0.01 to 0.3 wt. %.

To the preferred packaged beverage according to the present invention, it is possible to mix either singly or in combination additives such as antioxidants, flavorants, various esters, organic acids, organic acid salts, inorganic acids, inorganic acid salts, inorganic salts, colorants, emulsifiers, preservatives, seasoning agents, acidifiers, gums, emulsifiers, oils, vitamins, amino acids, fruit extracts, vegetable extracts, flower honey extracts, pH regulators and quality stabilizers.

In the packaged beverage according to the present invention, one or more of flavorants and fruit juices may be mixed to improve the taste. Natural or synthetic flavorants may be used in the packaged beverage according to the present invention. They can be selected from fruit juices, fruit flavors, plant flavors, and mixtures thereof. For the development of attractive tastes, preferred are combinations of fruit juices and tea flavors, and more preferred are combinations of fruit juices and green tea flavor or combinations of fruit juices and black tea flavor.

Preferred fruit juices include apple, pear, lemon, lime, mandarin, grapefruit, cranberry, orange, strawberry, grape, kiwi, pineapple, passion fruit, mango, guava, raspberry and cherry juices, and mixtures thereof. More preferred are citrus juices (preferably, grapefruit, orange, lemon, lime and mandarin juices), mango juice, passion fruit juice, guava juice, and mixtures thereof. Such juice can be contained at a concentration of preferably from 0.001 to 20 wt. %, more preferably from 0.002 to 10 wt. % in the packaged beverage according to the present invention.

Examples of natural flavorants include jasmine, chamomile, rose, peppermint, *Crataegus cuneata*, chrysanthemum, water caltrop, sugarcane, bracket fungus of the genus *Fomes* (*Fomes japonicus*), and bamboo shoot. Fruit juices, plant flavors, tea flavors and mixtures thereof may also be used as flavorants. Preferred flavorants are citrus flavors including orange flavor, lemon flavor, lime flavor and grapefruit flavor. In addition to such citrus flavors, various other flavors such as apple flavor, grape flavor, raspberry flavor, cranberry flavor, cherry flavor and pineapple flavor are also usable. These flavorants may be derived from natural sources such as fruit juices and balms, or may be synthesized. The term "flavorant" as used herein may also include blends of various flavors, for example, a blend of lemon and lime flavors and blends of citrus flavors and selected spices (typically, flavors for cola and other soft drinks). Such a flavorant can be mixed at a concentration of preferably from 0.0001 to 5 wt. %, more preferably from 0.001 to 3 wt. % in the packaged beverage according to the present invention.

The packaged beverage according to the present invention may also contain a sour seasoning as needed. Examples of the sour seasoning include malic acid, fumaric acid, adipic acid, phosphoric acid, gluconic acid, tartaric acid, ascorbic acid, acetic acid, phosphoric acid, and mixtures thereof.

A sour seasoning may also be used to regulate the pH of the packaged beverage according to the present invention. As a pH regulator, an organic or inorganic, edible acid may be used. The acid may be used either in a non-dissociated form or in the form of its salt. Examples of the salt include potassium hydrogenphosphate, sodium hydrogenphosphate, potassium dihydrogenphosphate, and sodium dihydrogenphosphate.

A sour seasoning is also useful as an antioxidant which stabilizes the ingredients in the beverage. Examples of commonly employed antioxidants include ascorbic acid, EDTA (ethylenediaminetetraacetic acid) and salts thereof, and plant extracts.

In the packaged beverage according to the present invention, one or more vitamins may be incorporated further. Preferred vitamins include vitamin A, vitamin C, and vitamin E. Other vitamins such as vitamin D and vitamin B may also be added. One or more minerals may also be incorporated in the packaged beverage according to the present invention. Preferred minerals include calcium, chromium, copper, fluorine, iodine, iron, magnesium, manganese, phosphorus, selenium, silicon, molybdenum, and zinc. More preferred minerals are magnesium, phosphorus, and iron.

Similar to general beverages, a molded package made of polyethylene terephthalate as a principal component (a so-called PET bottle), a metal can, a paper container combined with metal foils or plastic films, a bottle or the like may be used as a package for producing the packaged beverage according to the present invention. The term "packaged beverage" as used herein means a beverage that can be consumed generally without dilution.

The packaged beverage according to the present invention can be produced, for example, by filling the beverage in a container such as a metal can and, when heat sterilization is feasible, conducting heat sterilization under sterilization conditions as prescribed in the Food Sanitation Act of Japan. For those packages which cannot be subjected to retort sterilization like PET bottles or paper containers, a process is adopted such that the beverage is sterilized beforehand under similar sterilization conditions as those described above, for example, by a plate-type heat exchanger, wherein the beverage is cooled to a particular temperature and is then filled in a container. Under aseptic conditions, additional ingredients may be added to and filled in the beverage-filled container. It is also possible to conduct an operation such that subsequent to heat sterilization under acidic conditions, the pH of the beverage is restored to neutral under aseptic conditions or that subsequent to heat sterilization under aseptic conditions, the pH of the tea beverage is restored to acidic under aseptic conditions.

The following examples further describe and demonstrate embodiments of the present invention. The examples are given solely for the purpose of illustration and are not to be construed as limitations of the present invention.

EXAMPLES

Measurement of Catechins

A high-performance liquid chromatograph (model: "SCL-10AVP") manufactured by Shimadzu Corporation was used. The chromatograph was fitted with an LC column packed with octadecyl-introduced silica gel, "L-Column, TM ODS" (4.6 mm in diameter×250 mm in length; product of Chemicals Evaluation and Research Institute, Japan). A packaged beverage, which had been filtered through a filter (0.8 μm) and then diluted with distilled water, was subjected to chromatography at a column temperature of 35° C. by gradient elution. A 0.1 mol/L solution of acetic acid in distilled water and a 0.1 mol/L solution of acetic acid in acetonitrile were used as mobile phase solution A and mobile phase solution B, respectively. The measurement was conducted under the conditions of 20 μL of injected sample quantity and 280 nm UV detector wavelength.

<Measurement of Caffeine>
(Analyzer)
A high-performance liquid chromatograph (manufactured by Hitachi, Ltd.) was used.
Plotter: "D-2250", Detector: "L-4200", Pump: "L-7100", Autosampler: "L-7200", Column: "Inertsil ODS-2" (2.1 mm inner diameter×250 mm length).
(Analytical Conditions)
Injected sample quantity: 10 μL
Flow rate: 0.3 mL/min
Detection wavelength of UV spectrophotometer: 280 nm
Eluent A: 0.1 M solution of acetic acid in water
Eluent B: 0.1 M solution of acetic acid in acetonitrile
Concentration Gradient Conditions (vol. %)

| Time | Eluent A | Eluent B |
|---|---|---|
| 0 min | 97% | 3% |
| 5 min | 97% | 3% |

-continued

| Time | Eluent A | Eluent B |
|---|---|---|
| 37 min | 80% | 20% |
| 43 min | 80% | 20% |
| 43.5 min | 0% | 100% |
| 48.5 min | 0% | 100% |
| 49 min | 97% | 3% |
| 62 min | 97% | 3% |

(Retention Time of Caffeine)
Caffeine: 27.2 min

From each area % determined here, the corresponding wt. % was determined based on the standard substance.

<Measurement of Citric Acid or its Salt>

An ion chromatograph (model: "DXAQ 1110"; manufactured by Japan Dionex Co., Ltd.) was fitted with a Dionex "IonPac AS4A-SC" 4×250 mm column, and was connected to a suppressor, "ASRS-ULTRA" (manufactured by Dionex Corporation). Measurement of citric acid or its salt was performed in the recycle mode. As mobile phases, 1.8 mmol/L $Na_2CO_3$ and 1.7 mmol/L $NaHCO_3$ were fed at 1.0 mL/min. The injected sample quantity was set at 25 μL. An electrical conductivity detector was used as a detector.

<Quantitation of Sodium Ions>
Atomic Fluorescence Spectroscopy (Extraction with Hydrochloric Acid)

Each sample (5 g) was placed in 10% hydrochloric acid (to provide a 1% HCl solution when dissolved to a predetermined volume). With deionized water, the resulting solution was then brought to the predetermined volume, and its absorbance was measured.
Wavelength: 589.6 nm
Flame: acetylene-air <Quantitation of Potassium Ions>
Atomic Fluorescence Spectroscopy (Extraction with Hydrochloric Acid)

Each sample (5 g) was placed in 10% hydrochloric acid (to provide a 1% HCl solution when dissolved to a predetermined volume). With deionized water, the resulting solution was then brought to the predetermined volume, and its absorbance was measured.

Examples 1-4 & Comparative Examples 1-3

The packaged beverage of each example or comparative example was produced by mixing the corresponding ingredients shown in Table 1, and conducting sterilization treatment subsequent to filling the resultant mixture in a package.

TABLE 1

| | | Comp. Ex. | Examples | | | | Comparative Examples | |
|---|---|---|---|---|---|---|---|---|
| Ingredients | | 1 | 1 | 2 | 3 | 4 | 2 | 3 |
| Sweetener | | 1.42 | 1.42 | 1.42 | 1.42 | 1.42 | 1.42 | 1.42 |
| Grapefruit juice | | 0.025 | 0.025 | 0.025 | 0.025 | 0.025 | 0.025 | 0.025 |
| Mineral salts (Na, K) | | 0.10 | 0.10 | 0.10 | 0.10 | 0.10 | 0.10 | 0.10 |
| Antioxidant | | 0.06 | 0.06 | 0.06 | 0.06 | 0.06 | 0.06 | 0.06 |
| Green Tea Extract A | | 0.525 | 0.525 | 0.525 | 0.525 | 0.525 | 0.525 | 0.525 |
| Dextrin | | 0.16 | 0.16 | 0.16 | 0.16 | 0.16 | 0.16 | 0.16 |
| Flavorant | | 0.217 | 0.217 | 0.217 | 0.217 | 0.217 | 0.217 | 0.217 |
| Citric acid | | 0.21 | 0.19 | 0.143 | 0.128 | 0.112 | 0.12 | 0.095 |
| Trisodium citrate | | 0.08 | 0.1 | 0.075 | 0.107 | 0.125 | 0.18 | 0.05 |
| Deionized water | | 96.58 | 96.58 | 96.656 | 96.74 | 96.74 | 96.57 | 96.728 |
| Total (%, W/W) | | 100 | 100 | 100 | 100 | 100 | 100 | 100 |
| Concentration of citric acid or its salt (mM) | | 13.7 | 13.3 | 10.0 | 10.3 | 10.1 | 12.4 | 6.6 |
| pH | | 3.31 | 3.48 | 3.51 | 3.82 | 4.03 | 4.28 | 3.55 |
| | Conc. of non-polymer catechins (wt. %) | 0.11 | 0.11 | 0.11 | 0.11 | 0.11 | 0.11 | 0.11 |
| | Non-polymer catechins/caffeine | 20 | 20 | 20 | 20 | 20 | 20 | 20 |
| Ranking | Astringency and coarse aftertaste | Strong | Slightly strong | Weak | Weak | Weak | Weak | Weak |
| | Sourness | Strong | Good | Good | Good | Good | Weak | Weak |

"POLYPHENON HG" (100 g, product of Tokyo Food Techno Co., Ltd.) was suspended as a concentrate of green tea extract in a 950 aqueous solution of ethanol (490.9 g) while stirring at room temperature and 250 rpm. After activated carbon "KURARAY COAL GLC" (25 g, product of Kuraray Chemical K.K.) and acid clay "MIZKA ACE #600" (30 g, product of Mizusawa Chemical Industries, Ltd.) were poured, the resulting mixture was continuously stirred for about 10 minutes. Subsequent to the dropwise addition of a 40% aqueous solution of ethanol (409.1 g) over 10 minutes, stirring was continued for about 30 minutes at room temperature. After the activated carbon and a precipitate were filtered off by No. 2 filter paper, the filtrate was filtered again through a 0.2 μm membrane filter. Finally, deionized water (200 g) was added to the filtrate, ethanol was distilled off at 40° C. and 0.0272 $kg/cm^2$, and finally, the water content was adjusted to obtain the Green Tea Extract A.

After the treatment, the content of non-polymer catechins was 22 wt. %.

The weight ratio of non-polymer catechins to caffeine after the treatment=20.0

<Production Process of the Packaged Beverages of Examples 1-4 and Comparative Examples 1-3>

In accordance with the typical sports drink formulation shown in Table 1, the individual ingredients were combined together, deionized water was then added and thereby a mixed solution was prepared. The mixed solution was filled at 85° C. in a PET bottle. While holding the PET bottle upside down, it was subjected to sterilization for 10 minutes to obtain a non-tea-based, packaged beverage. The non-tea-based, packaged beverage was ranked for a stringency and sourness. The results are shown in Table 1.

As a result, the sourness and astringency of Comparative Example 1 with a low level of pH was too strong. In Comparative Example 2 with a high level of pH, its sourness was so weak that the taste of the beverage became vague as a whole. In Comparative Example 3 with a low concentration of citric acid or its salt, its astringency and aftertaste were effectively improved, but its sourness was so weak that the taste of the beverage became vague as a whole. In contrast, the beverages with the concentration of citric acid or a salt thereof falling within the range of from 9 to 13.5 and the pH falling within the range of from 3.4 to 4.2 was found not only to have reduced astringency and adequate sourness but also to be suitable for long-term drinking.

Evaluation of Flavor

A drinking test was made by five panelists.

Storage Test

Prepared drinks were each stored at 55° C. for 2 weeks. A change in the color tone of the drink before and after the storage was scored by observation of the five panelists with their naked eyes in accordance with the following criterion:

A: not changed, B: slightly changed, C: changed, and D: largely changed.

Furthermore the non-polymer catechins was measured.

Examples 5

Into 900 g of a 90.0 wt. ethanol solution was dispersed 100 g of a commercially available concentrate of a green tea extract ("POLYPHENON HG", manufactured by Mitsui Norin Co., Ltd.), and then the resultant was ripened for 30 minutes. The resultant was filtrated with a No. 2 filter paper and a filter paper having a pore diameter of 0.2 μm, and 200 mL of water was added to the filtrate. The solution was concentrated under reduced pressure to yield a purified product. In the resultant purified product of the green tea extract, the percentage of non-polymer catechins was 15.2 wt. %, and that of non-polymer catechin gallates was 58.1 wt. %. Into a stainless steel container was charged 75.0 g of the resultant purified product of the green tea extract, and then ion exchange water was added to the product so as to set the total amount of the solution to 1,000 g. To the solution was added 3.0 g of a 5 wt. % solution of sodium bicarbonate in water to adjust the pH to 5.5. Next, while the solution was stirred at 22° C. and 150 r/min., thereto was added a solution wherein 0.27 g (2.4% of the non-polymer catechins) of Kikkoman tannase KTFH (industrial grade, 500 U/g or more) was dissolved in 1.07 g of ion exchange water. After 55 minutes, the pH lowered to 4.24. At this time, the enzyme reaction was ended. Next, the stainless steel container was immersed into a hot water bath of 95° C. temperature. The container was kept at 90° C. for 10 minutes to inactivate the enzyme activity completely. Thereafter, the container was cooled to 25° C., and then the solution therein was concentrated. In the purified product of the green tea extract obtained after the tannase treatment, the percentage of non-polymer catechins was 15.0 wt. %, and the percentage of non-polymer gallates was 45.1 wt. %. Into 8.5 g of this aqueous solution of the purified product were dissolved 1.0 g of citric anhydride and 1.2 g of trisodium citrate. Next, thereto were added anhydrous crystal of fructose, erythritol, L-ascorbic acid, and a lemon lime flavor to set the total amount of the solution to 1,000 g. Thereafter, the solution was UHT-sterilized, and filled into a PET bottle. In this non-tea-based packaged beverage, the percentage of non-polymer catechins was 0.127 wt. %, the percentage of non-epimers was 15.0 wt. %, and the percentage of non-polymer gallates was 45.1 wt. %. The composition and the flavor evaluation result thereof are shown in Table 2.

Example 6

A non-tea-based packaged beverage was produced in the same way as in Example 5 except that 1.2 g of tripotassium citrate was used instead of trisodium citrate in Example 5. The composition, the flavor evaluation result and the storage test result thereof are shown in Table 2.

Example 7

A non-tea-based packaged beverage was produced in the same way as in Example 5 except that 36.6 g of anhydrous crystal of glucose was used instead of the anhydrous crystal of fructose in Example 5. The composition, the flavor evaluation result and the storage test result thereof are shown in Table 2.

Example 8

A non-tea-based packaged beverage was produced in the same way as in Example 5 except that 36.6 g of granulated sugar was used instead of the anhydrous crystal of fructose in Example 5. The composition, the flavor evaluation result and the storage test result thereof are shown in Table 2.

Example 9

A non-tea-based packaged beverage was produced in the same way as in Example 5 except that the amount of trisodium citrate in Example 5 was changed to 3.9 g. The composition, the flavor evaluation result and the storage test result thereof are shown in Table 2.

Example 10

A non-tea-based packaged beverage was produced in the same way as in Example 5 except that instead of citrate acid and trisodium citrate in Example 5, 1.0 g of phosphoric acid and 1.44 g of trisodium phosphate were used, respectively. The composition, the flavor evaluation result and the storage test result thereof are shown in Table 2.

Example 11

Into 5.0 g of the purified product of the green tea extract obtained in Example 5 were dissolved 2.2 g of a concentrate of a green tea extract, 0.3 g of citric anhydride, and 0.5 g of trisodium citrate. Next, thereto were added anhydrous crystal of fructose, erythritol, L-ascorbic acid, and a green tea flavor to set the total amount of the solution to 1,000 g. Thereafter, the solution was UHT-sterilized, and filled into a PET bottle. The composition and the flavor evaluation result of this packaged green tea beverage are shown in Table 2.

Example 12

Into 8.5 g of the purified product of the green tea extract obtained in Example 5 were dissolved 0.5 g of a concentrate of a black tea extracted liquid, 0.3 g of citric anhydride, and 0.5 g of trisodium citrate. Next, thereto were added anhydrous crystal of fructose, erythritol, L-ascorbic acid, a lemon flavor and a black tea flavor to set the total amount of the solution to 1,000 g. Thereafter, the solution was UHT-sterilized, and filled into a PET bottle. The composition and the flavor evaluation result of this packaged black tea beverage are shown in Table 2.

Comparative Example 4

A non-tea-based packaged beverage was produced in the same way as in Example 5 except that: in Example 5, treatment with ethanol was conducted; 8.5 g of the purified product of the green tea extract which had not yet been treated with the tannase, 14.2 g of anhydrous crystal of glucose, 1.9 g of citric anhydride, and 1.0 g of trisodium citrate were incorporated; and fructose was removed. The composition, the flavor evaluation result and the storage test result thereof are shown in Table 2.

Comparative Example 5

A non-tea-based packaged beverage was produced in the same way as in Example 5 except that the amount of citric acid was changed to 0.1 g in Example 5. The composition, the flavor evaluation result and the storage test result thereof are shown in Table 2.

TABLE 2

|  |  | Example 5 | Example 6 | Example 7 | Example 8 | Example 9 | Example 10 |
|---|---|---|---|---|---|---|---|
| Blend formulation | Purified product (wt. %) of green tea extract containing non-polymer catechins | 0.85 | 0.85 | 0.85 | 0.85 | 0.85 | 0.85 |
|  | Concentrate (wt. %) of green tea extract | — | — | — | — | — | — |
|  | Concentrate (wt. %) of black tea extracted liquid | — | — | — | — | — | — |
|  | (E) Anhydrous crystal (wt. %) of fructose | 3.66 | 3.66 | — | — | 3.66 | 3.66 |
|  | (E) Anhydrous crystal (wt. %) of glucose | — | — | 3.66 | — | — | — |
|  | (E) Granulated sugar (wt. %) | — | — | — | 3.66 | — | — |
|  | (E) Erythritol (wt. %) | 0.75 | 0.75 | 0.75 | 0.75 | 0.75 | 0.75 |
|  | (C) Sour seasoning: citric acid (wt. %) | 0.1 | 0.1 | 0.1 | 0.1 | 0.1 | — |
|  | (D) pH adjuster: 3Na citrate (wt. %) | 0.12 | — | 0.12 | 0.12 | 0.39 | — |
|  | (D) pH adjuster: 3K citrate (wt. %) | — | 0.12 | — | — | — | — |
|  | (C) Sour seasoning: phosphoric acid (wt. %) | — | — | — | — | — | 0.1 |
|  | (D) pH adjuster: 3Na phosphate (wt. %) | — | — | — | — | — | 0.144 |
|  | (C) L-ascorbic acid (wt. %) | 0.05 | 0.05 | 0.05 | 0.05 | 0.05 | 0.05 |
|  | Lemon lime flavor (wt. %) | 0.1 | 0.1 | 0.1 | 0.1 | 0.1 | 0.1 |
|  | Lemon flavor (wt. %) | — | — | — | — | — | — |
|  | Black tea flavor (wt. %) | — | — | — | — | — | — |
|  | Green tea flavor (wt. %) | — | — | — | — | — | — |
|  | Deionized water (wt. %) | Balance | Balance | Balance | Balance | Balance | Balance |
| Total amount (wt. %) |  | 100 | 100 | 100 | 100 | 100 | 100 |
| (D)/(C) |  | 0.8 | 0.8 | 0.8 | 0.8 | 2.6 | 0.96 |
| After sterilization | pH | 4.02 | 4.02 | 4.01 | 4.01 | 4.95 | 3.99 |
|  | (A) Non-polymer catechins (wt. %) | 0.127 | 0.127 | 0.127 | 0.127 | 0.127 | 0.127 |
|  | (B) Non-epimers (wt. %) | 15.0 | 15.0 | 15.0 | 15.0 | 15.0 | 15.0 |
|  | (F) Gallate percentage (wt. %) | 45.1 | 45.1 | 45.1 | 45.1 | 45.1 | 45.1 |
|  | (G) Caffeine/(A) (—) | 0.052 | 0.052 | 0.052 | 0.052 | 0.052 | 0.052 |
|  | Bitterness | 1 | 1 | 1 | 1 | 1 | 1 |
|  | Sourness | 1 | 1 | 1 | 1 | 1 | 1 |
| Color tone after storage (at 55° C. for 2 weeks) |  | A | A | A | A | A | A |
| Non-polymer catechins (wt. %) after storage (at 55° C. for 2 weeks) |  | 0.111 | 0.112 | 0.110 | 0.119 | 0.102 | 0.105 |

|  |  | Example 11 | Example 12 | Comparative Example 4 | Comparative Example 5 |
|---|---|---|---|---|---|
| Blend formulation | Purified product (wt. %) of green tea extract containing non-polymer catechins | 0.5 | 0.85 | 0.85 | 0.85 |
|  | Concentrate (wt. %) of green tea extract | 0.22 | — | — | — |
|  | Concentrate (wt. %) of black tea extracted liquid | — | 0.05 | — | — |
|  | (E) Anhydrous crystal (wt. %) of fructose | 3.66 | 3.66 | — | 3.66 |
|  | (E) Anhydrous crystal (wt. %) of glucose | — | — | 1.42 | — |
|  | (E) Granulated sugar (wt. %) | — | — | — | — |
|  | (E) Erythritol (wt. %) | 0.75 | 0.75 | 0.75 | 0.75 |
|  | (C) Sour seasoning: citric acid (wt. %) | 0.03 | 0.03 | 0.19 | 0.01 |
|  | (D) pH adjuster: 3Na citrate (wt. %) | 0.05 | 0.05 | 0.1 | 1.5 |
|  | (D) pH adjuster: 3K citrate (wt. %) | — | — | — | — |
|  | (C) Sour seasoning: phosphoric acid (wt. %) | — | — | — | — |
|  | (D) pH adjuster: 3Na phosphate (wt. %) | — | — | — | — |
|  | (C) L-ascorbic acid (wt. %) | 0.05 | 0.05 | 0.05 | 0.05 |
|  | Lemon lime flavor (wt. %) | — | — | 0.1 | 0.1— |
|  | Lemon flavor (wt. %) | — | 0.1 | — | — |
|  | Black tea flavor (wt. %) | — | 0.01 | — | — |
|  | Green tea flavor (wt. %) | 0.05 | — | — | — |
|  | Deionized water (wt. %) | Balance | Balance | Balance | Balance |
| Total amount (wt. %) |  | 100 | 100 | 100 | 100 |
| (D)/(C) |  | 0.62 | 0.62 | 0.42 | 25 |

TABLE 2-continued

|  |  |  |  |  |  |
|---|---|---|---|---|---|
| After sterilization | pH | 4.01 | 4.01 | 3.48 | 6.0 |
|  | (A) Non-polymer catechins (wt. %) | 0.130 | 0.128 | 0.127 | 0.127 |
|  | (B) Non-epimers (wt. %) | 15.0 | 15.0 | 15.0 | 44.9 |
|  | (F) Gallate percentage (wt. %) | 50.5 | 45.2 | 58.1 | 45.1 |
|  | (G) Caffeine/(A) (—) | 0.106 | 0.079 | 0.055 | 0.052 |
|  | Bitterness | 1 | 1 | 4 | 1 |
|  | Sourness | 1 | 1 | 2 | 3 |
| Color tone after storage (at 55° C. for 2 weeks) |  | A | A | B | D |
| Non-polymer catechins (wt. %) after storage (at 55° C. for 2 weeks) |  | 0.101 | 0.104 | 0.088 | 0.081 |

1) Five-rank evaluation of bitterness: 1: no bitterness, 2: largely reduced bitterness, 3: reduced bitterness, 4: slightly reduced bitterness, and 5: bitterness
2) Three-rank evaluation of sourness: 1: preferable sourness, 2: ordinary sourness, and 3: slight sourness
3) Color tone after the storage: A: not changed, B: slightly changed, C: changed, and D: largely changed From Table 2, it is evident that about the packaged beverage of the invention, a decrease in bitterness and an appropriate sourness are compatible with each other without damaging flavor, and the beverage is suitable for being stored for a long term.

What is claimed is:

1. A non-tea based packaged beverage with which a purified product of a green tea extract is mixed,
    the beverage comprising 0.06 to 0.5% by weight of non-polymer catechins (A),
    the percentage of non-epimers (B) of the non-polymer catechins in the non-polymer catechins (A) being from 5 to 15% by weight after heat sterilization,
    the beverage comprising 0.01 to 0.5% by weight of one or more sour seasonings (C) selected from the group consisting of citric acid, gluconic acid, tartaric acid, lactic acid, fumaric acid, malic acid, phosphoric acid, and ascorbic acid,
    the beverage comprising 0.01 to 0.5% by weight of one or more pH adjusters (D) selected from the group consisting of a sodium salt and a potassium salt of citric acid, gluconic acid, tartaric acid, lactic acid, fumaric acid, malic acid, phosphoric acid, and ascorbic acid,
    the ratio by weight of the component (D)/the component (C) [(D)/(C)] being from 0.5 to 5.0,
    the pH of the beverage being 5.1 or less, and
    the beverage comprising 0.0001 to 20% by weight of a sweetener (E).

2. The packaged beverage according to claim 1, wherein the percentage of non-polymer catechin gallates (F) is from 35 to 50.5% by weight of non-polymer catechins (A).

3. The packaged beverage according to claim 1, wherein the ratio by weight of caffeine (G) to the non-polymer catechins (A) [(G)/(A)] is from 0.0001 to 0.16.

4. The packaged beverage according to claim 1, wherein the sour seasoning is citric acid and the pH adjuster is trisodium citrate.

5. The packaged beverage according to claim 1, which is a non-fermentation-tea beverage.

6. The packaged beverage according to claim 1, which is a fermentation beverage.

7. The packaged beverage according to claim 1, further comprising one or more selected from the group consisting of inositol, thiamine hydrochloride, thiamine nitrate, riboflavin, sodium riboflavin 5'-phosphate, niacin, nicotinic-acid amide, calcium pantothenate, pyridoxy hydrochloride, cyanocobalamine, folic acid, and biotin.

8. The packaged beverage according to claim 1, which has a sweetness of 2 or more when the sweetness of saccharose is regarded as 1.

9. The packaged beverage according to claim 1, which is a carbonated drink.

10. The packaged beverage according to claim 1, which is a non-carbonated water.

11. The packaged beverage according to claim 1, which is an enhanced water.

12. The packaged beverage according to claim 1, which is a functional drink.

13. The packaged beverage according to claim 1, which is a bottled water.

14. The packaged beverage according to claim 1, which is a sports drink.

15. The packaged beverage according to claim 1, which is a near water.

16. The packaged beverage according to claim 1, which has a calorie less than 40 kcal/240-mL or less.

17. The packaged beverage according to claim 1, wherein the percentage of non-epimers (B) of the non-polymer catechins in the non-polymer catechins (A) being from 8 to 15% by weight after heat sterilization.

18. The packaged beverage according to claim 1, wherein the percentage of non-epimers (B) of the non-polymer catechins in the non-polymer catechins (A) being from 10 to 15% by weight after heat sterilization.

* * * * *

UNITED STATES PATENT AND TRADEMARK OFFICE
CERTIFICATE OF CORRECTION

| | |
|---|---|
| PATENT NO. | : 8,652,560 B2 |
| APPLICATION NO. | : 11/845356 |
| DATED | : February 18, 2014 |
| INVENTOR(S) | : Hosoya et al. |

Page 1 of 1

It is certified that error appears in the above-identified patent and that said Letters Patent is hereby corrected as shown below:

Title Page, Item (75) Inventor is corrected to read:
-- Naoki Hosoya, Tokyo (JP);
Shinji Yamamoto, Tokyo (JP);
Masaki Iwasaki, Tokyo (JP);
Eiichi Hoshino, Tokyo (JP);
Yoshikazu Ogura, Tokyo (JP);
Masahiro Fukuda, Tokyo (JP);
Hirokazu Takahashi, Tokyo (JP);
Ryo Kusaka, Tokyo (JP)
Eri Itaya, Tokyo (JP) --.

Signed and Sealed this
Fifteenth Day of December, 2015

Michelle K. Lee
*Director of the United States Patent and Trademark Office*